US009336252B2

(12) United States Patent
Garratt et al.

(10) Patent No.: US 9,336,252 B2
(45) Date of Patent: May 10, 2016

(54) MOBILE APPLICATION CACHE BASED ON EXTREME SCALE TECHNOLOGY

(71) Applicant: International Business Machines Corporation, Armonk, NY (US)

(72) Inventors: Jeffrey D. Garratt, Apex, NC (US);
Dinakaran Joseph, Apex, NC (US);
Todd E. Kaplinger, Raleigh, NC (US);
Craig A. Lanzen, Durham, NC (US);
Victor S. Moore, Lake City, FL (US);
Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/677,888

(22) Filed: Nov. 15, 2012

(65) Prior Publication Data
US 2014/0136479 A1    May 15, 2014

(51) Int. Cl.
*G06F 17/00* (2006.01)
*G06F 17/30* (2006.01)

(52) U.S. Cl.
CPC .... *G06F 17/30309* (2013.01); *G06F 17/30174* (2013.01)

(58) Field of Classification Search
CPC ............... G06F 17/30286; G06F 17/30575; G06F 17/30289
USPC ........................................ 707/610, 640, 661
See application file for complete search history.

(56) References Cited

U.S. PATENT DOCUMENTS

| 7,546,298 | B2* | 6/2009 | Hulaj ..................... G06F 9/4443 |
| 7,779,074 | B2* | 8/2010 | Surtani et al. ................. 709/205 |
| 2007/0088791 | A1* | 4/2007 | Clarke .......................... 709/206 |
| 2009/0271799 | A1 | 10/2009 | Barsness et al. |
| 2010/0005153 | A1 | 1/2010 | Tsao |
| 2010/0123005 | A1 | 5/2010 | Guess et al. |
| 2011/0197186 | A1 | 8/2011 | Barker et al. |
| 2012/0042164 | A1 | 2/2012 | Gagnon et al. |
| 2014/0089671 | A1* | 3/2014 | Logue et al. .................. 713/182 |

OTHER PUBLICATIONS

Kirby et al, IBM WebSphere eXtreme Scale V7: Solutions Architecture, Dec. 2009, First Edition, 77 pages.*
Surtani et al, JBoss Cache User Guide, Jun. 2007, Release 2.0.0 Habanero, 88 pages.*
Surtani et al, "JBoss Cache User Guide", Release 2.0.0 Habanero, Jun. 2007, 88 pages.*
"ObjectGrid architecture", Jan. 30, 2009, https://www.ibm.com/developerworks/wikis/display/objectgridprog/ObjectGrid+architecture.
Office Action dated Jun. 12, 2015 received in the co-pending continuation application, namely, U.S. Appl. No. 14/062,293.

* cited by examiner

*Primary Examiner* — Rehana Perveen
*Assistant Examiner* — Loc Tran
(74) *Attorney, Agent, or Firm* — Scully, Scott, Murphy & Presser, P.C.; Dermott Cooke

(57) ABSTRACT

Storing data from mobile devices may comprise receiving an asynchronous communication from a mobile device over a wireless network notifying that data was dropped in a synchronizing folder; computing a hash value associated with the data; determining based on the computed hash value, a partition of an object grid comprising a plurality of virtual machines; and storing the data on the partition.

11 Claims, 5 Drawing Sheets

US 9,336,252 B2

MOBILE APPLICATION CACHE BASED ON EXTREME SCALE TECHNOLOGY

FIELD

The present application relates generally to computers, computer systems and data storage, and more particularly to mobile application cache based on extreme scale technology.

BACKGROUND

A known method exchanges data between a plurality of compute nodes having Java™ Virtual Machines (JVM). Each JVM includes a set of computer program instructions capable of executing a distributed Java™ application and each compute node includes wireless network adapters to exchange data between compute nodes wirelessly. Another known method provides an external storage system for a wireless device, wherein the external storage system comprises a controlled distributed scalable virtual machine system for store data.

Yet another known method provides for downloading and updating data between a mobile device and distributed database. A checksum is used to determine whether the document has changed.

Generally, wireless devices can store data to one or more virtual machines. In addition, a web application may communicate with a storage device remotely.

BRIEF SUMMARY

A method for mobile application cache, in one aspect, may comprise receiving an asynchronous communication from a mobile device over a wireless network notifying that data was dropped in a synchronizing folder. The method may further comprise computing a hash value associated with the data. The method may also comprise determining based on the computed hash value, a partition of an object grid comprising a plurality of virtual machines. The method may also comprise storing the data on the partition. In one aspect, the receiving the asynchronous communication comprises receiving the name-value pair in a queue.

A system for storing data from mobile devices, in one aspect, may comprise memory and a list of name-value pairs stored on the memory. The system may also comprise a synchronization module operable to execute on the processor and to receive an event from a mobile device notifying that data was dropped in a synchronizing folder on the mobile device. The synchronization module may be further operable to copy payload data from the mobile device's event into the list of name-value pairs. The system may also comprise an object grid module operable to compute a hash value of a name-value pair to which the payload data was copied. The object grid module may be further operable to determine based on the computed hash value, a partition of an object grid comprising a plurality of virtual machines and to store the payload data on the determined partition. The system may also comprise a queue module operable to detect whether the name-value pair has changed. The queue module may be further operable to communicate the detected change to the mobile device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
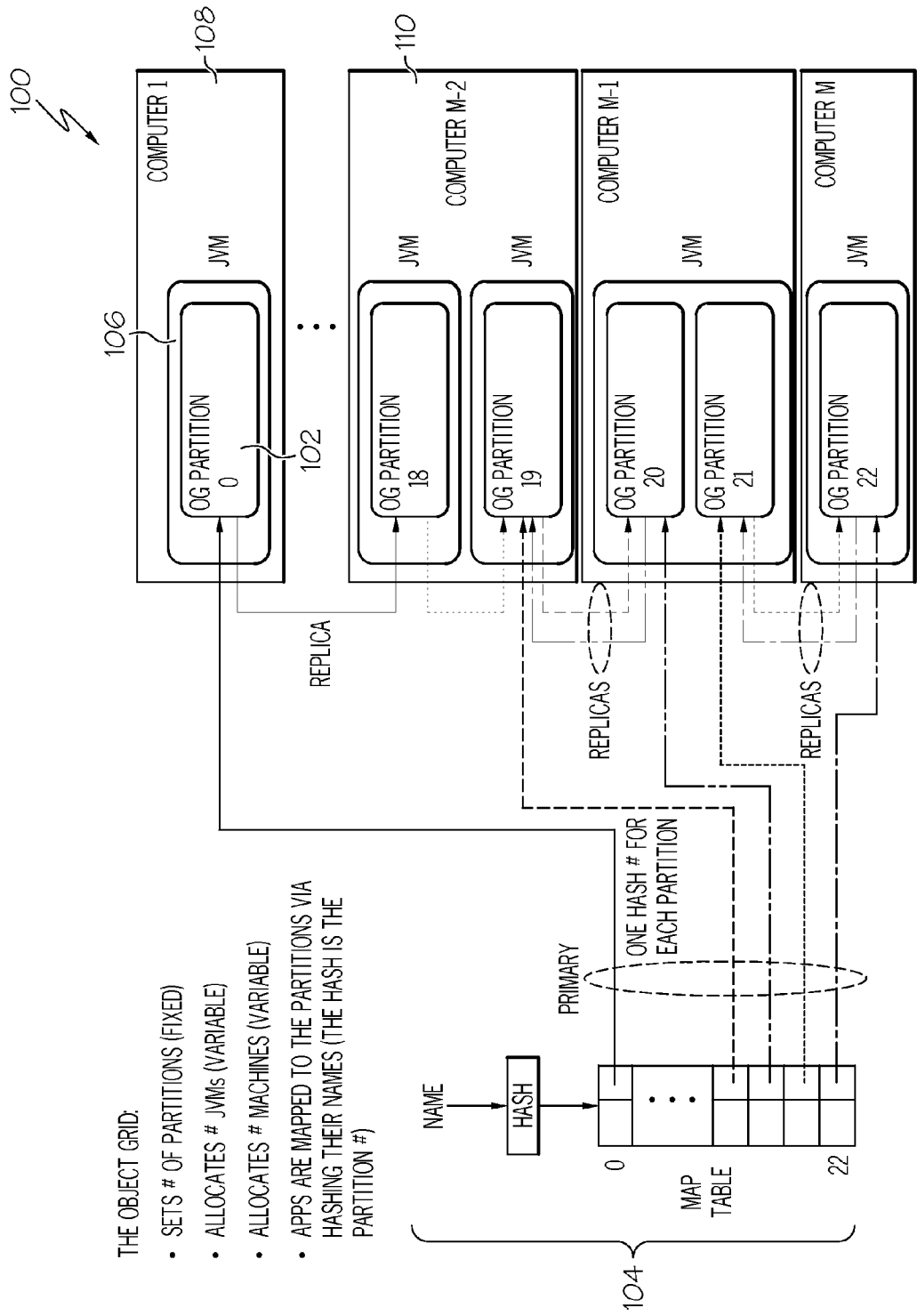
FIG. 1 is a diagram illustrating Object Grid architecture in one embodiment of the present disclosure.

A methodology of the present disclosure in one embodiment builds a system wherein a large number of mobile devices can reliably cache data within a collection of computers called an Object Grid (OG). FIG. 1 is a diagram illustrating OG architecture. An OG 100 is a sophisticated data cache. An OG is distinguished from other caches by its availability and extreme scalability. Applications on mobile devices use an OG 100 to reliably save and retrieve data. Data is sent to an OG via the payload of an event. The OG stores this payload in the shards of a grid.

A grid is a collection of shards; a shard is a container for storing data. Shards come in two flavors; primary and replica. A replica is a copy of the primary. A primary and one or more of its replicas is called a partition (e.g., 102). When an OG is initialized it determines the number of partitions to create. Once created the number of partitions is fixed. Data is stored in the shards assigned to these partitions. Data is mapped into partitions. The mapping is a hash on the data name (e.g., shown at 104). The hash selects which partition to use. The most common hash is a "modulo" seeded with the number of defined partitions. The OG copies the respective data to the primary and secondary shards of the selected partition (based on the hash). Shards reside in container Java Virtual Machines (JVM's), e.g., shown at 106.

The OG maps its partitions onto a set of container JVMs. A container JVM is a JVM that serves as a data store in a grid. For increased availability, the OG puts the primary and replica shards of a partition on different JVMs and if possible different physical machines (e.g., shown as different computers 108, 110). In this way if one JVM fails, its shards can be restored. For example, if a replica shard is lost, the primary shard is used to create another replica. If a primary shard is lost then its replica is promoted to be the primary and another replica is created from it. As before, the primary and replica shards are always placed on separate container JVMs. To achieve failover, for example, the primary and replica are located on separate JVMs and more than likely separate nodes (i.e., servers).

Partitions separate the mapping of "shards to JVMs" from the mapping of "data to shards". This separation allows JVMs to be added or removed without disturbing the "data to shards" mapping or the number of partitions.

Container JVMs are managed by a Catalog Service (CS). The CS runs on a JVM separate from the container JVMs. At a minimum an OG has one CS and one Grid. When a JVM is added to an OG it registers with the CS via a "well known static address". The JVM gives the CS a reference to its container for the storing and retrieving of shards.

The OG concept in one embodiment of the present disclosure is extended to include an object that is a list of name-value pairs, logic to receive an event from a mobile device, code to copy the payload from the mobile device's event into a list of name-value pairs, a mechanism that detects when a name-value pair in a list has changed, a facility that communicates changes back to the originating mobile device via sending the changed data back to the device in the payload of an event message, and an API associated with each list for the purpose of allowing applications to access and modify the data in the lists.

A name-value pair comprises a key and a value such as firstname=john and lastname=doe, where "firstname" is the name and "john" is the value in that example, and "lastname" is the name and "doe" is the value in that name-value pair example.

Logic (e.g., module) to receive an event from a mobile device may be implemented in one embodiment with data synchronization mechanism such as those used in Dropbox™. Such mechanism of the present disclosure in one embodiment provides a client device mechanism for storing the name-value pair (also referred to as key-value or key/value). Such mechanism may also have an instance running in the cloud or the like computing infrastructure, where the server takes the data entry in the client device and puts it in a queue. Based upon the partition (hashing of the key) the data is assigned to a specific partition.

A code or logic to copy the payload from the mobile device's event into a list of name-value pairs may utilize the Dropbox™ or the like synchronization mechanism. Other technologies that allow storing and synchronizing content between two or more endpoints may be utilized.

A facility communicates changes back to the originating mobile device via sending the changed data back to the device in the payload of an event message. In one embodiment of the present disclosure, this facility is implemented as a queue. The queue may include a mechanism that actively polls the synchronization mechanism to determine if there have been changes. If there have been changes, the methodology of the present disclosure determines the key that changed and starts the process of sending the changes back to the mobile device.

An API may be associated with each list for the purpose of allowing applications to access and modify the data in the lists. Such API may be implemented as part of a cloud instance that provides synchronization mechanism.

In one embodiment of the present disclosure, one or more queues or like data structure may be utilized. When a list of name-value pairs in the OG is modified, the changes are sent to a queue for delivery back to the application (e.g., mobile application) associated with the list. Each queue has a profile that tells the OG how to process the queue. For example, messages in the queue may have assigned priority, or billing instructions, or analytic triggers, and so on. Further, messages are sent back to the mobile device as they are processed or they remain in the queue until requested by the corresponding application, or they are just purged from the queue.

Figure 2:
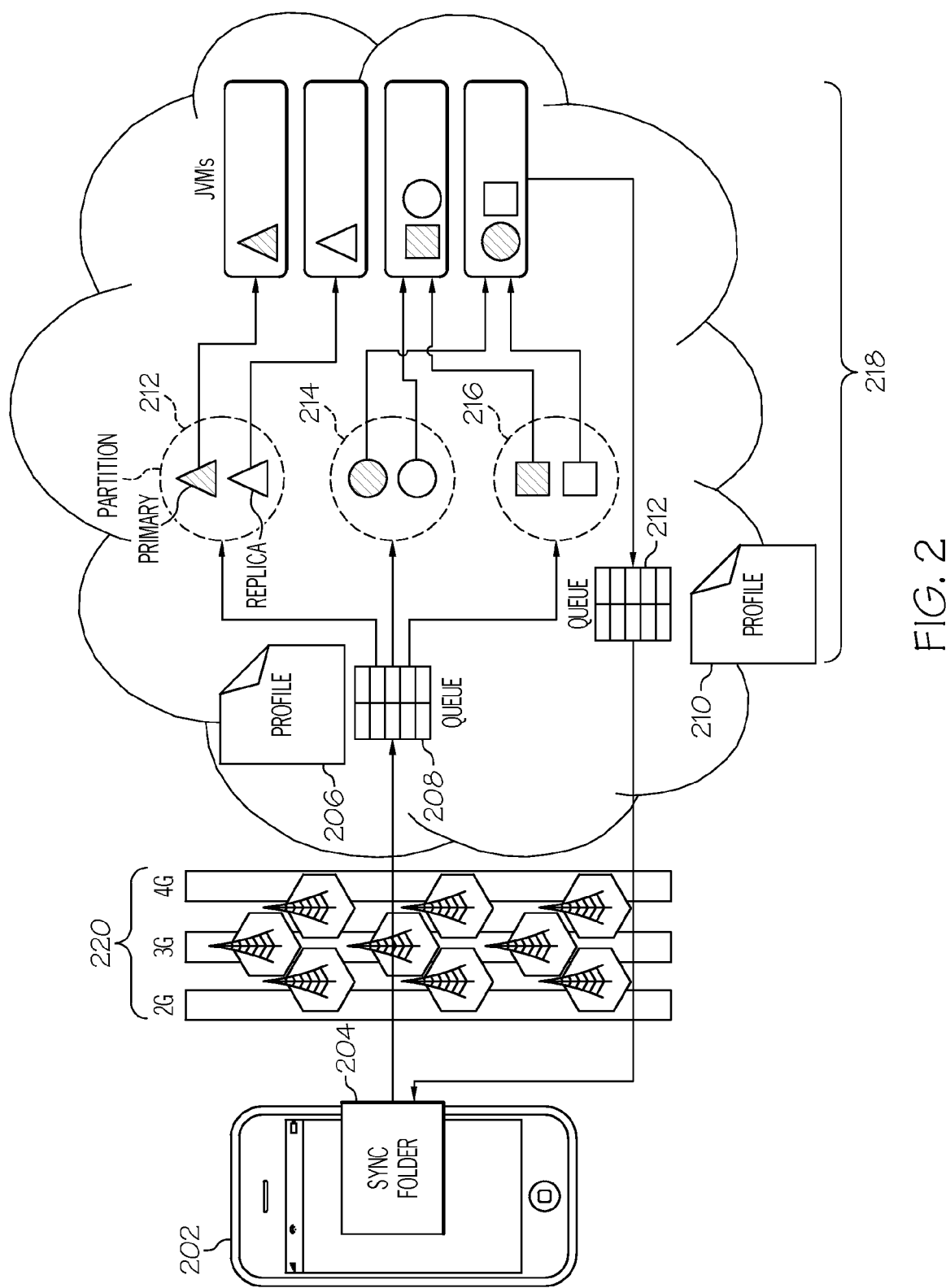
FIG. 2 is another architectural diagram illustrating system components of the present disclosure in one embodiment.

FIG. 2 is another architectural diagram illustrating system components of the present disclosure in one embodiment. In one embodiment of the methodology of the present disclosure, data travels between a mobile client 202 to the OG via the notion of a file hosting, storing and synchronization tool 204 or methodology or the like such as a Dropbox-like mechanism. In general, Dropbox is known as a Web-based file hosting service operated by Dropbox™, Inc. that uses cloud computing to enable users to store and share files and folders with others across the Internet using file synchronization. The synchronization is one-way, from the client Dropbox to the file systems storing the data dropped. The methodology of the present disclosure extends this concept to include a bidirectional data flow with "call backs" to the respective file folder or container 204 such as the Dropbox. In the present disclosure, such Dropbox-like element or folder on a client or mobile device is referred to as a synchronizing folder 204, e.g., a file or data folder. When data is returned to a synchronizing folder 204, the synchronizing folder 204 in turn sends the data to the application that originally dropped the respective data onto the synchronizing folder 204. The association in one embodiment is via a call back or other asynchronous means, such as an SMS to notify the application about the data's availability.

A methodology of the present disclosure in one embodiment provides a highly available mobile device cache that can persist the cached changes back to enterprise application servers, e.g., on a cloud infrastructure. In one aspect, the client is driving all of the function. The client caches the content using ObjectGrid and then via the functionalities of ObjectGrid, it is listened for on a server instance, e.g., the cloud instance. This event is then received and put on the queue for further processing. In one embodiment, there is no need to push cache from the server instance (e.g., the cloud) back to the device.

When an object on the mobile device 202 is dropped onto a synchronizing folder 204, the logic within that synchronizing folder 204 uses introspection to determine if it includes a callback method to return data to the associated application on the mobile device 202. The callback can be a remote procedure call (RPC) or a RESTful command or a Short Message Service (SMS) address that the server uses to notify client applications that data is available for pickup from the synchronizing folder 204.

The methodology of the present disclosure extends the concept of an OG to include a synchronizing folder 204 on a mobile device 202, at least one OG receive queue 208, at least one OG send queue 212, and a profile (e.g., 206, 210) for managing these queues. The synchronizing folder 204 integrates the applications on a mobile device 202 with an OG cache connected to a wireless network 220 for the purpose of reliably storing and retrieving data in a highly available data store. A synchronizing folder 204 is a software entity on a mobile device 202 whereon data can be logically dropped and sent over a wireless network 220 to an OG 218 wherein the data is cached in the OG's partitions 212, 214, 216. An OG queue 208 receives the data from a synchronizing folder 204, uses the name given to the data to compute the associated hash code and corresponding partition address, and saves the data within the primary and replica shards for that partition (e.g., 216). A profile 206 is used to determine the order in which items in the queue are saved, the application of billing rules to each item, the "time to live" for the associated data, and the rules that determine if and when the saved data will be returned back to the synchronizing folder 204. A typical rule would be to return data when it has changed. Another might be to batch data changes and return them to the appropriate synchronizing folder as a group, or to return the data after a given period of time. Additional or different rules may apply.

When data is returned to a synchronizing folder 204, the synchronizing folder 204 (the logic associated with the synchronizing folder) in turn sends the data to the application that originally dropped the respective data onto the synchronizing folder 204. The association is via a callback or other asynchronous means, such as an SMS to notify the application about the data's availability.

An enhanced Dropbox concept connects mobile device applications to an OG, which serves as a scalable data cache for the mobile device. The methodology of the present disclosure in one embodiment provides for building a simple architecture for reliably saving and retrieving data from highly available storage devices created by an OG connected to a wireless network. In one embodiment, the data is sent to and received from the OG 218 via asynchronous events. It is thus ideal for the mobile environment which may fade in and out of service frequently. It also scales to millions of mobile devices with little difficulty and provides the means by which data is stored in and synchronized with external sources. The queues used to receive events from and to send events to applications running in mobile devices provide buffering and elasticity.

Figure 3:
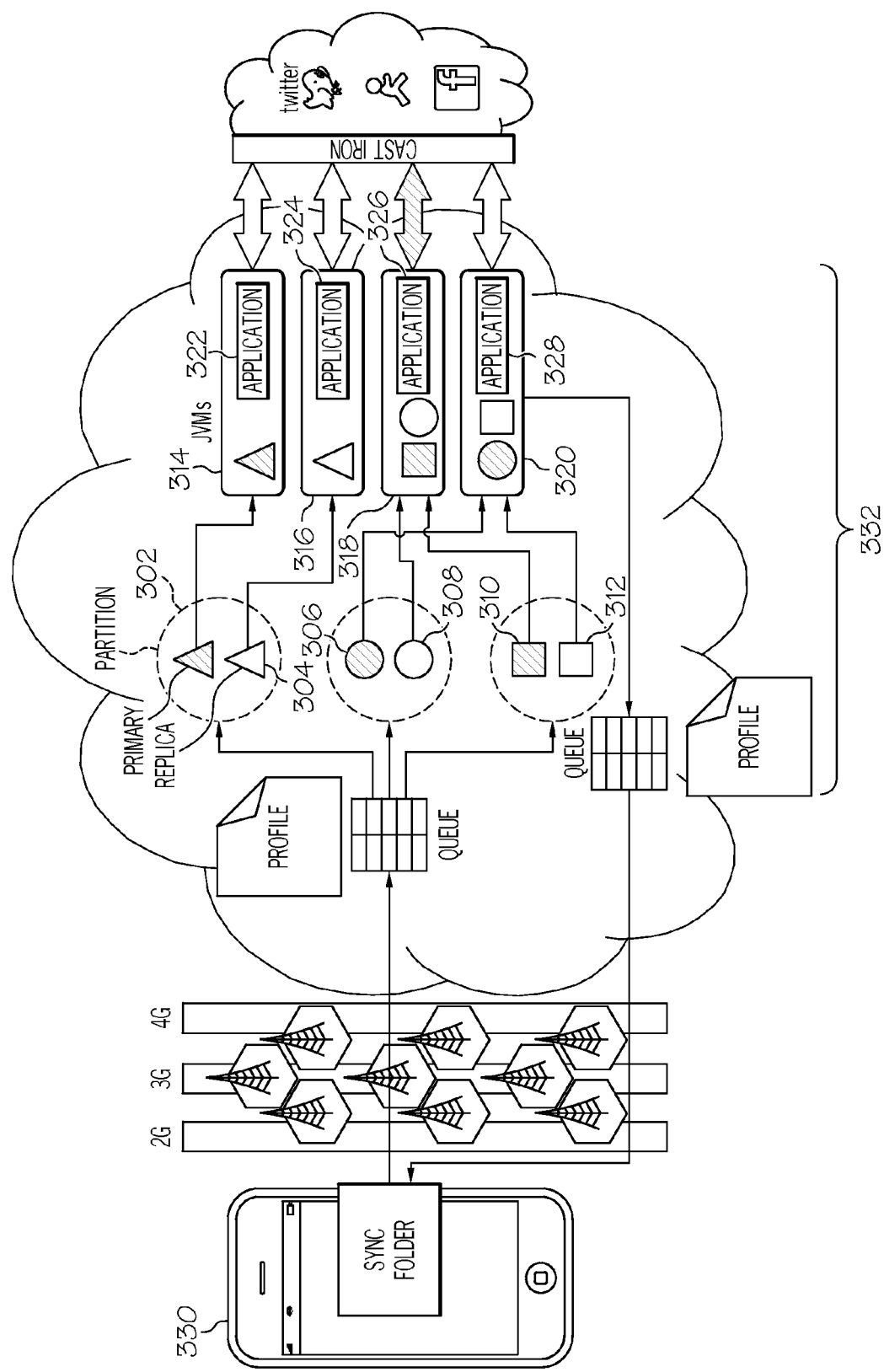
FIG. 3 is an architectural diagram illustrating system components that provide the association of application to data saved in the shards of an OG in one embodiment of the present disclosure.

In another aspect, a methodology of the present disclosure may provide an association of an application to the data saved in the shards of an Object Grid (OG). FIG. 3 is an architectural diagram illustrating system components that provide the association of application to data saved in the shards of an OG in one embodiment of the present disclosure. In the present disclosure, in one embodiment, shards (e.g., 302, 304, 306, 308, 310, 312) are mapped to JVMs (e.g., 314, 316, 318, 320), and applications (e.g., 322, 324, 326, 328) within the JVMs subscribe to the data in the shards. A Java Virtual Machine (JVM) may host one or more containers and each container can host multiple shards. A JVM therefore contains the applications that are associated with the data in the JVMs shards.

An application within a JVM can receive and modify shard data or it can pass the data to an external service for further processing. Typical external services are SAP™, Twitter™, Amazon™, Facebook™, and so on. For example, consider a service like Twitter™. A mobile client 330 can save data in a shard (e.g., 310) where an application exists that connects to Twitter™. This application bridges the gap between the data in the shard and the protocol needed to transfer that data to Twitter™. If a response is generated by Twitter™, or if unsolicited data is received from Twitter™, that data populates the shard and in doing so causes the changed data in the shard to be returned to the application in the associated mobile client 330. OG architecture is further described in https://www.ibm.com/developerworks/wikis/display/objectgridprog/ObjectGrid+architecture (blank spaces are inserted in the URL so that the text does not automatically convert to a hypertext link), disclosure of which is incorporated herein by reference.

In one aspect, a methodology of the present disclosure may add to the above-described enhanced Dropbox™-like concept that connects mobile device applications to an OG, the scaffolding necessary to connect the cached data in the OG to external services. An application (e.g., 322, 324, 326, 328) in the JVM (e.g., 314, 316, 318, 320) of an OG 332 can: 1) Subscribe to the data in a shard, 2) Fetch the subscribed to data from a shard, 3) Process the fetched data, 4) Transfer the data to an external service, 5) Receive data back from a service, 6) Update the subscribed data within a shard, and 7) send the changed data in the shard back to the originating mobile application.

In one embodiment, the connection between a mobile application and its shard data is always asynchronous, while the connection between shard data and external services can be either synchronous or asynchronous, depending on the requirements of the external service. The methodology of the present disclosure in one embodiment allows a provider of application to enrich the data within the grid with content from external sources. The result is a highly scalable and highly available Mobile Application Platform (MAP) for applications to provide services to mobile devices.

Figure 4:
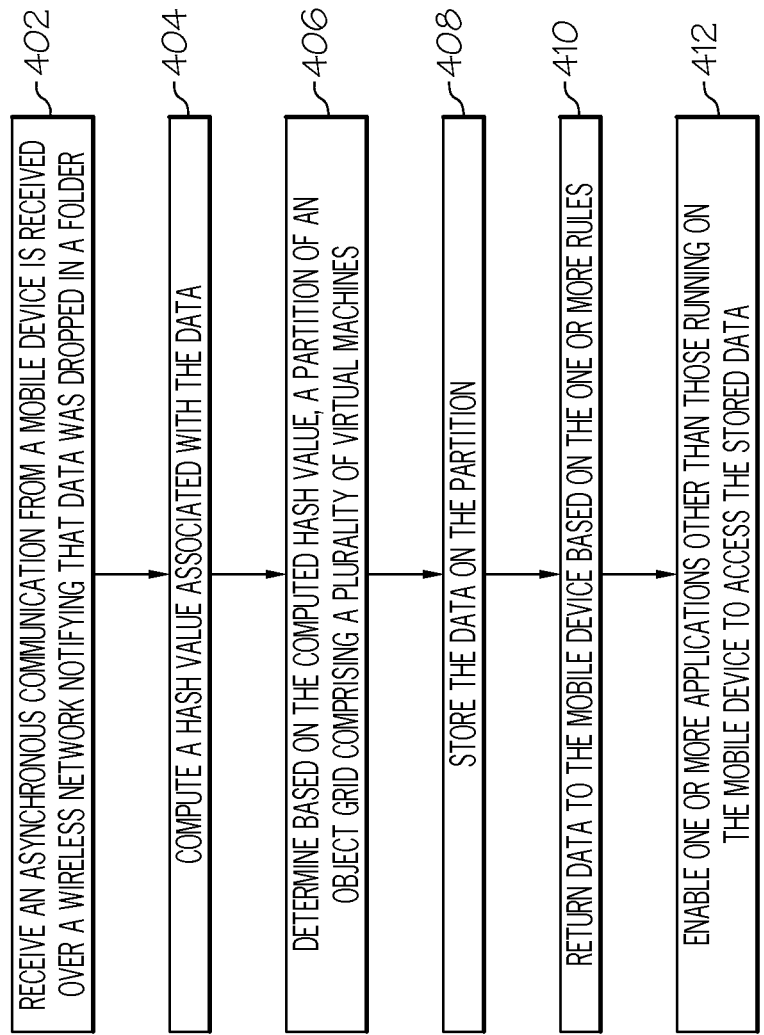
FIG. 4 is a flow diagram illustrating a method of the present disclosure in one embodiment.

FIG. 4 is a flow diagram illustrating a method of storing data from mobile devices of the present disclosure in one embodiment. At 402, an asynchronous communication from a mobile device is received over a wireless network notifying that data was dropped in a synchronizing folder of the present disclosure in one embodiment. The asynchronous communication may be an event notification comprising a name-value pair. The name-value pair may be received on an object grid queue and profile information associated with the name-value pair may be received. The profile information specifies one or more rules applicable to storing and managing of the name-value pair. At 404, a hash value or the like may be computed associated with the data. At 406, based on the computed hash value, a partition of an object grid comprising a plurality of virtual machines is determined. At 408, the data is stored on the partition. In one embodiment, a primary version of the data is stored on a primary shard of the partition and a replica version of the data is stored on a replica shard of the partition. In one aspect, the data may be returned to the mobile device based on the one or more rules as shown at 410. Yet in another aspect, one or more applications other than those running on the mobile device may be enabled to access the stored data as shown at 412.

While the above descriptions referred to Dropbox™, it should be noted that Dropbox™ product is not required in implementing methodologies of the present disclosure. Rather, similar synchronization methods or other file hosting, data storing and synchronization methods may be utilized, e.g., for seamless syncing of data between a device (e.g., a mobile device) and a server (e.g., cloud instance) and distributed storage mechanism of data, files or documents. In the present disclosure, the notion of such mechanism is extended to include a queue that is able to listen for events (e.g., cache entry modifications) and then react to these events to publish the key/value (name-value) pairs to the ObjectGrid, which is responsible for making these cache entries highly available via the partition and sharding design models.

Figure 5:
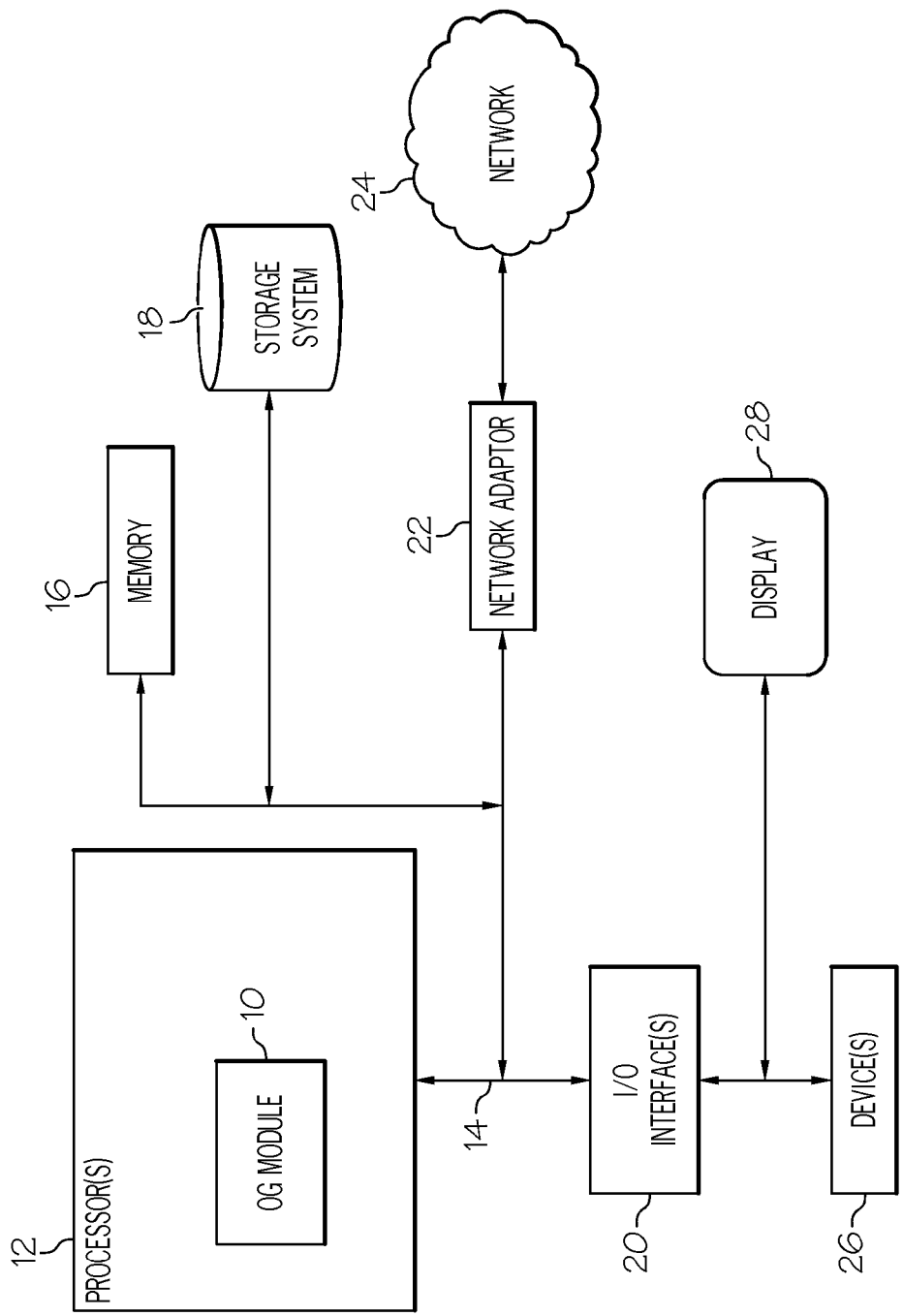
FIG. 5 illustrates a schematic of an example computer or processing system that may implement a system in one embodiment of the present disclosure.

FIG. 5 illustrates a schematic of an example computer or processing system that may implement one or more methodologies of the present disclosure in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an OG module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory computer readable storage medium storing a program of instructions executable by a machine to perform a method for mobile application cache, comprising:
   receiving an asynchronous communication from a mobile device over a wireless network notifying that data was dropped in a synchronizing folder on the mobile device by one or more of a plurality of applications;
   computing a hash value associated with the data;
   determining based on the computed hash value, a partition of an object grid comprising a plurality of virtual machines; and
   storing the data on the partition,
   wherein the plurality of applications on the mobile device are allowed to save respective data in the object grid and retrieve the respective data from the object grid over the wireless network via the synchronizing folder on the mobile device, the asynchronous communication comprising at least profile information associated with a name-value pair of an object grid queue, the profile information comprising one or more rules that specify an order in which items in the queue are saved, an application of billing rules, a time-to-live for an associated data, and a rule that determines whether and when the saved data will be returned back to the synchronizing folder, the method further comprising returning the data to the mobile device based on the one or more rules.

2. The non-transitory computer readable storage medium of claim 1, wherein the storing the data on the partition comprises storing a primary version of the data on a primary shard of the partition and storing a replica version of the data on a replica shard of the partition.

3. The non-transitory computer readable storage medium of claim 2, wherein the asynchronous communication comprises an event notification comprising a name-value pair.

4. The non-transitory computer readable storage medium of claim 3, wherein the receiving the asynchronous communication comprises receiving the name-value pair on an object grid queue and the profile information associated with the name-value pair.

5. The non-transitory computer readable storage medium of claim 4, wherein the one or more rules are associated with storing and managing of the name-value pair.

6. The non-transitory computer readable storage medium of claim 3, further comprising: enabling an application running on one or more of the plurality of virtual machines to access the stored data.

7. The non-transitory computer readable storage medium of claim 1, wherein the receiving the asynchronous communication comprises receiving the name-value pair in a queue.

8. A system for mobile application cache, comprising:
a processor;
memory;
a list of name-value pairs stored on the memory;
a synchronization module operable to execute on the processor and to receive an event from a mobile device notifying that data was dropped in a synchronizing folder on the mobile device by one or more of a plurality of applications on the mobile device, the synchronization module further operable to copy payload data from the mobile device's event into the list of name-value pairs;
an object grid module operable to compute a hash value of a name-value pair to which the payload data was copied, the object grid module further operable to determine based on the computed hash value, a partition of an object grid comprising a plurality of virtual machines and to store the payload data on the determined partition;
a queue module operable to detect when the name-value pair has changed, the queue module further operable to communicate the detected change to the mobile device,
wherein the plurality of applications on the mobile device are allowed to save respective data in the object grid and retrieve the respective data from the object grid over the wireless network via the synchronizing folder on the mobile device; and
a profile information with the name-value pair of an object grid queue, the profile comprising one or more rules that specify an order in which items in the queue are saved, an application of billing rules, a time-to-live for an associated data, and a rule that determines whether and when the saved data will be returned back to the synchronizing folder,
the queue module operable to return the data to the mobile device based on the one or more rules.

9. The system of claim 8, further comprising an application programming interface associated with the list of name-value pairs through which one or more applications access data of the name-value pairs.

10. The system of claim 8, the object grid module accesses the profile to determine how to process the name-value pairs.

11. The system of claim 8, wherein the name-value pairs stored on the memory as a queue data structure.

* * * * *